E. F. GENRICH.
CULTIVATOR.
APPLICATION FILED JULY 16, 1914.
1,166,516.
Patented Jan. 4, 1916.
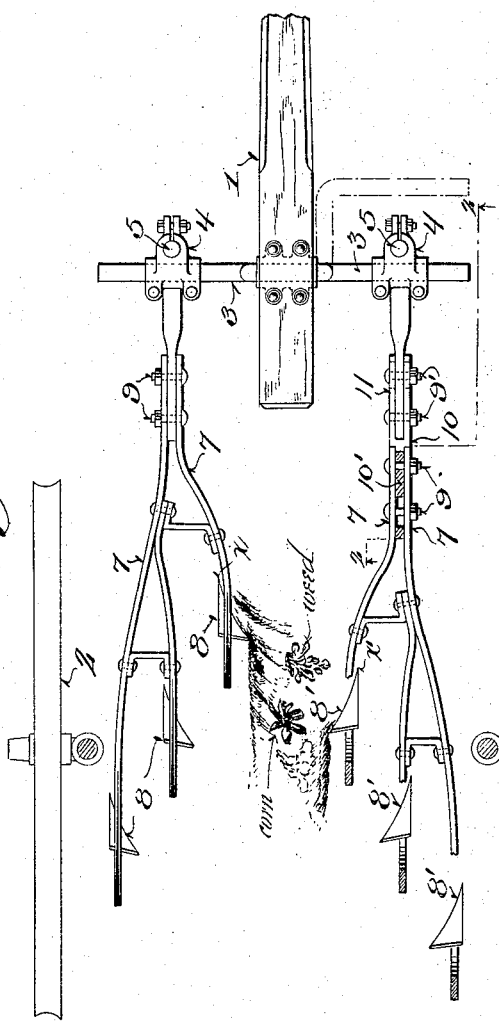
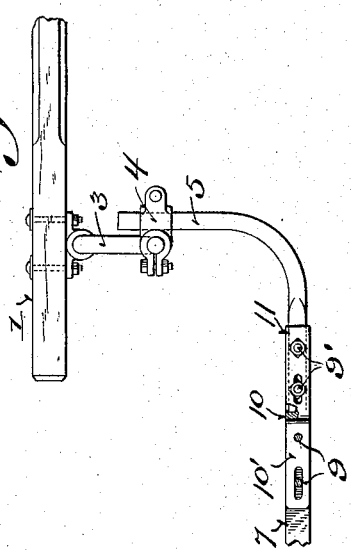
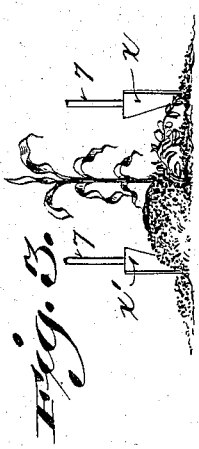

UNITED STATES PATENT OFFICE.

ERNEST F. GENRICH, OF OCONOMOWOC, WISCONSIN.

CULTIVATOR.

1,166,516.  Specification of Letters Patent.  Patented Jan. 4, 1916.

Application filed July 16, 1914. Serial No. 851,247.

*To all whom it may concern:*

Be it known that I, ERNEST F. GENRICH, a citizen of the United States, and resident of Oconomowoc, in the county of Waukesha and State of Wisconsin, have invented certain new and useful Improvements in Cultivators; and I do hereby declare that the following is a full, clear, and exact description thereof.

My invention has for its object to provide a simple, economical and effective means in connection with any standard type of cultivator for exterminating weeds or other foreign growth that may spring up in alinement with the rows of corn or other plant in its development.

In cultivators, as they are now constructed, the alined inner companion teeth or shovels throw the soil up upon either side in a hill row about the stalk of the plant simultaneously and any weeds that may be alined with the rows of plants are consequently hilled or cultivated in the same manner. Hence the object of cultivating the plant is, in a great measure, defeated, owing to the fact that these weeds are left to grow and eventually choke the corn or sap the soil.

My invention will eliminate the objectionable features mentioned by arranging one of the companion shovels in advance of the other, whereby the weeds will be covered by the soil, the covering being effected by the advanced shovel first folding the earth over upon the stalk of the weeds whereby they are bent down and next fully covered by the following shovel which folds the soil over the bent tops of the weeds, it being understood that the corn or other plant as a matter of fact is higher and stronger of stalk than the flimsy weed ordinarily found growing with the cultivated plant.

With the above objects in view the invention consists in certain peculiarities of construction and combination of mechanical elements as set forth hereinafter with reference to the accompanying drawings and subsequently claimed.

In the drawings Figure 1 represents a fragmentary plan view of a riding cultivator embodying the features of my invention; Fig. 2, a detailed side elevation of the gang cultivator draft connection, and Fig. 3, a diagrammatic sectional elevation through the soil showing a weed and the manner of burying the same.

Referring by characters to the drawings, 1 represents a portion of the draft pole of any type of riding cultivator, 2 the wheels and 3 a transversely disposed draft bar, which bar carries a pair of adjustable couplings 4 that have clamped therein the vertically disposed shank portions of a draft neck 5. Each of the draft necks, under ordinary conditions, have attached thereto the front ends of the draft beams 7 of a gang cultivator carrying teeth or shovels 8, 8'. Ordinarily, as shown in connection with the right hand gang or cultivator element, each draft neck is fitted between members of the draft beam 7 and secured by bolts 9. Hence each cultivator element is positioned with its front or inner tooth $x$ in such position, whereby the said companion sets of teeth or shovels will simultaneously throw up a layer of dirt and fold the same in hill-like form over the stalk to be cultivated.

My invention provides means for dropping one of the series of cultivator elements back of the companion series, whereby, as shown in the plan view, the inner front tooth $x'$ will be dropped back a predetermined distance from the companion inner tooth $x$.

In the exemplification of my invention shown, when it is desired to convert an ordinary cultivator to perform the functions of a weed destroyer, I employ an auxiliary extension link 10, the shank 10' of which is fitted between the draft beam elements 7 and secured by the standard bolts 9 which pass through apertures in said shank. One of the bolt apertures is elongated, as shown, to permit adjustment or accommodation between the retaining bolts 9 of various types of cultivators now upon the market wherein the distance between said bolts is slightly different. The forward end of the extension link 10 constitutes a head having tongues 11, between which the lower end of the draft neck 5 is fitted and secured by bolts 9', one of the latter being passed through elongated bolt-receiving apertures with which the link tongues are provided, to permit slight adjustment similar to the adjustment in connection with the draft beam. By interposing this link and connecting the same rigidly to the lower end of the draft neck and draft beam of one of the cultivator elements, it will be observed that said cultivator element is thus lengthened or dropped backward of its companion cultivator element, whereby the companion inner shovels $x$, $x'$, are arranged in echelon.

It is obvious from the foregoing description and with reference to the plan view and diagram, when the cultivator is put into motion, the forward companion shovel $x$ will throw or fold the soil about the body of the weed and the weight of said soil will press the weed downward, whereby its laid over top will be in position to receive a corresponding fold of earth thrown thereover by the following companion shovel $x'$. Hence the weeds which are alined with the corn will all be buried and thus destroyed by decay which will, as a matter of fact, serve to enrich the soil, it being understood that the stalks of the cultivated plants are much stronger than the weed and are of such height with relation thereto that they will resist pressure of the soil about the stalk so as to prevent being buried with the weeds.

I claim:

In a cultivator having a draft pole, a draft neck carried thereby having bolt-receiving apertures at its lower end, and a cultivator tooth-carrying draft beam comprising spaced members having apertures at their ends one of which is elongated; the combination of a lengthening device for interposition between the draft neck and draft beam, comprising an auxiliary link having a shank adapted to fit between the spaced ends of said draft beam members, the link shank being provided with apertures, one of which is elongated for registration with the apertures of the draft beam members, a head portion extending from the shank of the link having spaced tongue members provided with alined apertures, sets of which tongue apertures are elongated to register with the draft neck apertures, and bolts passing through the several alined sets of apertures for securing the shank and tongue portions of the link to the draft neck and draft beam, whereby said draft beam is dropped back of its normal position with relation to the draft neck.

In testimony that I claim the foregoing I have hereunto set my hand at Oconomowoc in the county of Waukesha and State of Wisconsin in the presence of two witnesses.

ERNEST F. GENRICH.

Witnesses:
 FRANK A. MEYER,
 GEO. A. DIBBLE.

Copies of this patent may be obtained for five cents each, by addressing the "Commissioner of Patents, Washington, D. C."